United States Patent
Yamanaka

(10) Patent No.: US 6,359,895 B1
(45) Date of Patent: Mar. 19, 2002

(54) COMMUNICATION CONTROL APPARATUS AND METHOD FOR CONTROLLING COMMUNICATIONS ON A NETWORK HAVING A TREE-SHAPE TO IMPROVE THE USAGE OF BUFFERS AND REDUCE UNDESIRABLE DISCARD OF DATA

(75) Inventor: Masayuki Yamanaka, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/030,347

(22) Filed: Feb. 25, 1998

(30) Foreign Application Priority Data

Oct. 17, 1997 (JP) .............................................. 9-284169

(51) Int. Cl.[7] .............................................. H04L 12/28
(52) U.S. Cl. ...................................... 370/408; 370/410
(58) Field of Search ................................ 370/252, 256, 370/230, 236, 408, 410, 412, 413, 235

(56) References Cited

U.S. PATENT DOCUMENTS 4,876,681 A * 10/1989 Hagiwara et al. ........... 370/408
5,253,248 A * 10/1993 Dravida et al. ............. 370/252
5,809,012 A * 9/1998 Takase et al. ............... 370/229

FOREIGN PATENT DOCUMENTS

| JP | 583255 | 4/1993 |
| JP | 7135512 | 5/1995 |

* cited by examiner

Primary Examiner—Chau Nguyen
Assistant Examiner—Chiho Andrew Lee
(74) Attorney, Agent, or Firm—Rosenman & Colin LLP

(57) ABSTRACT

The inside of a managed side device managed by a manager of a managing device has a tree-structure consisting of points #1 to #3 of the first to third layers. When a failure occurs, at the point #3 of the bottom layer, loss priority is allocated to a PDU and is transmitted to the point #2 in a higher order. When the number of PDUs is greater than the threshold of the number of alarms, at the point #2 a buffer is prevented from overflowing by instructing a lower order point not to transmit a PDU, or by eliminating PDUs with loss priority lower than the threshold of loss priority. By executing these processes at each point, congestion due to the concentration of PDUs can be locally processed.

12 Claims, 11 Drawing Sheets

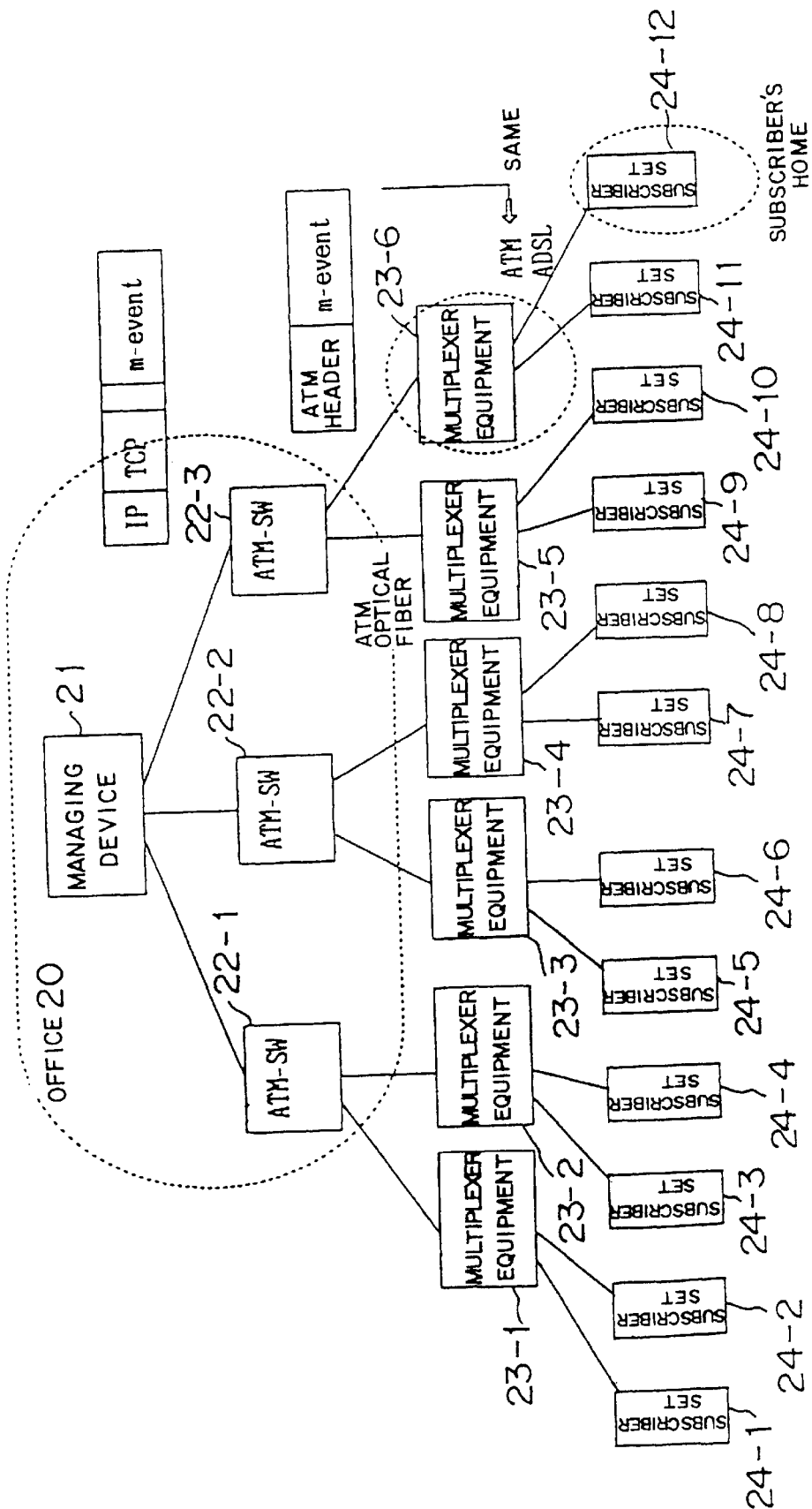
F I G. 3

COMMUNICATION CONTROL APPARATUS AND METHOD FOR CONTROLLING COMMUNICATIONS ON A NETWORK HAVING A TREE-SHAPE TO IMPROVE THE USAGE OF BUFFERS AND REDUCE UNDESIRABLE DISCARD OF DATA

BACKGROUND OF THE INVENTION

1. Field of the Invention

The present invention relates to an apparatus and method for controlling communications on a network.

2. Description of the Related Art

With the recent improvements in electronics technology there is a tendency to install multiple devices in one piece of equipment, and the units for controlling this equipment over a network are becoming progressively larger. In a general communication network, there is also a tendency that the network is becoming complicated due to the spread of multimedia, etc.

When a network has a tree-structure with three or more layers, and when a communication method is adopted in which protocol data units (PDUs) (a general nomenclature of packets for carrying messages and commands) are transmitted from a lower order point (corresponding to a node on a network) to a higher point, and the PDUs are collected at the higher order point, the number of the PDUs collected at one point increases as the PDUs go up to a higher order point, an unexpected volume of PDUs are concentrated at one time, and a problem occurs such that they become stacked due to a buffer becoming full and the limitations of the processing capability.

Particularly when, in the common management information protocol (CMIP) of a network management system, protocol failures in the apparatus are collected at a higher order point as alarms, they are transmitted using an m-event-report, which causes the above-mentioned problems.

FIGS. 1A and 1B explain a conventional apparatus in which CMIP is adopted.

CMIP is an open system interconnection (OSI) network management protocol for collectively managing resources relating to an open system, and is positioned in an application layer of an OSI basic reference model. CMIP is specified in X.711 and ISO (International Standards Organization) 09596.

As shown in FIG. 1A, the basic model of OSI management specifies communications between a managing side system 1100 and a managed side system 1101. A manager 1102 manages a managed object (MO) 1104 in the managed side system 1101 through an agent 1103. Accordingly, by defining the operation of an MO 1104 in relation to the network, the manager 1102 can manage the network. The manager 1102 operates the MO 1104 by various kinds of CMIP operations, and receives events which occur in the MO 1104 as a report.

FIG. 1A shows a system management model specified in the OSI management.

Resources to be managed are extracted and a system is managed as an MO 1104 provided corresponding to each resource. There are the two concepts of an MO class and an MO instance in the MO 1104. The MO class is a definition of common characteristics for a plurality of concrete management targets (MO instances), whereas the MO instance is a concrete management target for representing an MO class.

In the MO class, attributes possessed by the MO 1104, operations given to the MO 1104, reactions to the operations, reports from the MO 1104, etc. are defined.

The CMIP operations can be roughly divided into management operations of the manager 1102 for the agent 1103, and reports from the agent 1103 to the manager 1102.

Management operations include m-get, m-set, m-action, m-create and m-delete. The commands m-get, m-set, m-action, m-create and m-delete are for obtaining attribute values, setting attribute values, operating the MO 1104, adding the MO 1104 and deleting the MO 1104, respectively.

There is a command called an m-event-report for generating a report from the MO 1104 to the manager 1102.

FIG. 1B shows the configuration of a PDU of an m-event-report.

The parameters of the m-event-report include an invoke identifier, mode, class identifier, instance identifier, event type, event time and event information. The invoke identifier designates an identifier assigned to a report. Each operation is distinguished by this identifier. The mode designates a particular mode of the m-event-report. The managed object class (MO class) of the class identifier designates the MO class in which an event occurs. The managed object instance (MO instance) of the instance identifier designates the MO instance in which an event occurs. The event type designates the type of an event to be reported. The event time indicates the time when an event occurs. The event information includes information on events. By means of a PDU including an m-event-report command containing each of these parameters, an alarm is reported to a higher order point. Here, an event means any change of state which occurs at each point, such as occurrence of a buffer-full state.

The apparatus form of the managed side system is not specified. As described before, the model of the OSI management specifies only communications between the manager 1102 and agent 1103. However, it is often the case that here and there in the apparatus, information of an event is transmitted in a form including a PDU of an m-event-report, and the collecting form of the alarms has a hierarchical structure. The larger the scale of a network, the stronger this tendency becomes.

When a network has a tree-structure with three or more layers, a communication method in which PDUs are transmitted from a lower order point to a higher point, and the PDUs are collected at the higher order point, a problem occurs such that the number of PDUs collected at one point increases as the PDUs go up to a higher order point, and then an unexpected volume of PDUs are concentrated at one time, so they are stacked due to a buffer becoming full and the limitations of the processing capability. At that time, in such a procedure as buffer resetting executed because a buffer has become full, or a CPU resetting, all PDUs are discarded, even if some of the PDUs contain important information. However, despite a buffer being full in a certain place on a network, there is a possibility that an empty buffer exists elsewhere on the network. It is because buffer information is not transmitted and received between higher and lower order points that these buffers cannot be effectively used. Further, when a buffer is full and a user wants to eliminate a PDU, the PDU is indiscriminately eliminated, since it cannot be judged whether or not the PDU contains important information.

SUMMARY OF THE INVENTION

It is an object of the present invention to provide a communication apparatus in which a buffer on a network is effectively used by transmitting and receiving buffer information between a higher order point and a lower order point on a network having a tree-structure and in which important information cannot be easily eliminated.

The communication control apparatus of the present invention is used in a system where a plurality of monitoring target units are connected on a tree-shaped network, and each monitoring target unit comprises a receiving unit for receiving data from a lower order monitoring target unit on a tree-shaped network, a buffering unit for temporarily storing the received data, a transmitting unit for transmitting data stored in the buffering unit to a higher order monitoring target unit on the tree-shaped network, and a monitoring unit for monitoring the volume of data stored in the buffering unit, and instructing the lower order monitoring unit not to transmit the data to a higher order monitoring target unit when the data volume exceeds a predetermined threshold.

The communication control method of the present invention is a communication control method used in a system in which a plurality of monitoring target units are connected on a tree-shaped network, and which comprises a receiving step for receiving data from a lower order monitoring target unit on a tree-shaped network, a step for temporarily storing the received data, a transmitting step for transmitting the data stored temporarily to a higher order monitoring target unit on the tree-shaped network, and a step for monitoring the volume of the data stored, and instructing the lower order monitoring unit not to transmit the data to a higher order monitoring target unit when the data volume exceeds a predetermined threshold.

According to the present invention, when data (reporting occurrence of a failure, etc.) transmitted from a lower order monitoring target unit (point) is collected in a higher order monitoring target unit, the collected data volume in the higher order monitoring target unit increases, and a buffer for receiving the data often overflows, since a network is structured in a tree shape. For this reason, the apparatus is configured so as to compare the data volume in the buffer with a predetermined threshold and to instruct a lower order monitoring unit which transmits data not to transmit the data when the data volume in the buffer exceeds the threshold. Thus, the buffer of one monitoring target unit can be prevented from overflowing, and the buffers for the whole network can be effectively used, since data not transmitted is stored in the buffer of a lower monitoring target unit.

BRIEF DESCRIPTION OF THE DRAWINGS

FIG. 3 explains a configuration of the communications network to which the present invention can be applied.

DESCRIPTION OF THE PREFERRED EMBODIMENTS

The present invention is a communication apparatus in which a communication method is adopted, in which a network has a tree-structure with three or more layers, PDUs are transmitted from a lower order point being a monitoring target unit to a higher order point being also a monitoring target unit, and the PDUs are collected at a higher point.

Particularly, as an apparatus adopting the above-mentioned communication method, a network management system (NMS) is taken up. That is, in an apparatus on a network, failures of the apparatus are collected as alarms. At that time, PDUs are transmitted from lower order points to higher order points.

As a network management protocol, CMIP is popular. The embodiment described below particularly presumes that the apparatus is suitable to CMIP.

In the present invention, the apparatus attaches loss priority (the greater the degree of elimination is, the lower the value becomes) to a PDU at the lowest order point, and monitors the number of collected PDUs at a higher order point. When in a certain place a buffer is about to overflow, and there is an instruction not to transmit a PDU from a higher order point, the apparatus obtains a loss priority from a received PDU, compares the loss priority with a predetermined threshold of priority, and eliminates the PDU if the loss priority is lower than the predetermined threshold of priority. When the apparatus eliminates a PDU, it stores information on the elimination (how many PDUs are eliminated, etc.), refers to a list of the past elimination information, and reports to the higher order point that a PDU has been eliminated. Further, when the number of PDUs increases so as to exceed a predetermined threshold, and the buffer is still about to overflow, it instructs the lower order point not to transmit a PDU.

Figure 1A:
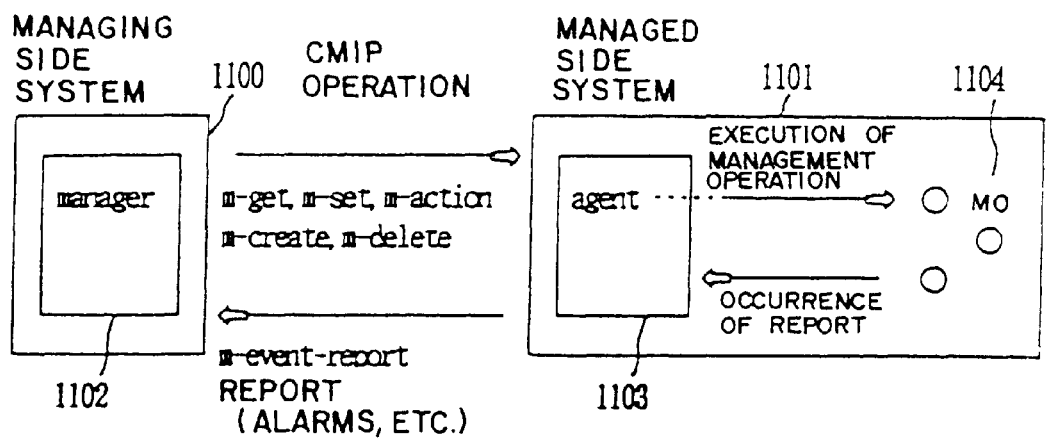
FIGS. 1A and 1B explain a conventional apparatus in which a CMIP is adopted.
Figure 1B:
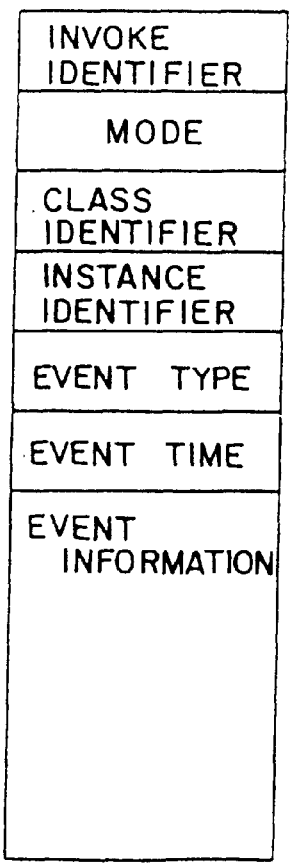
Figure 2:
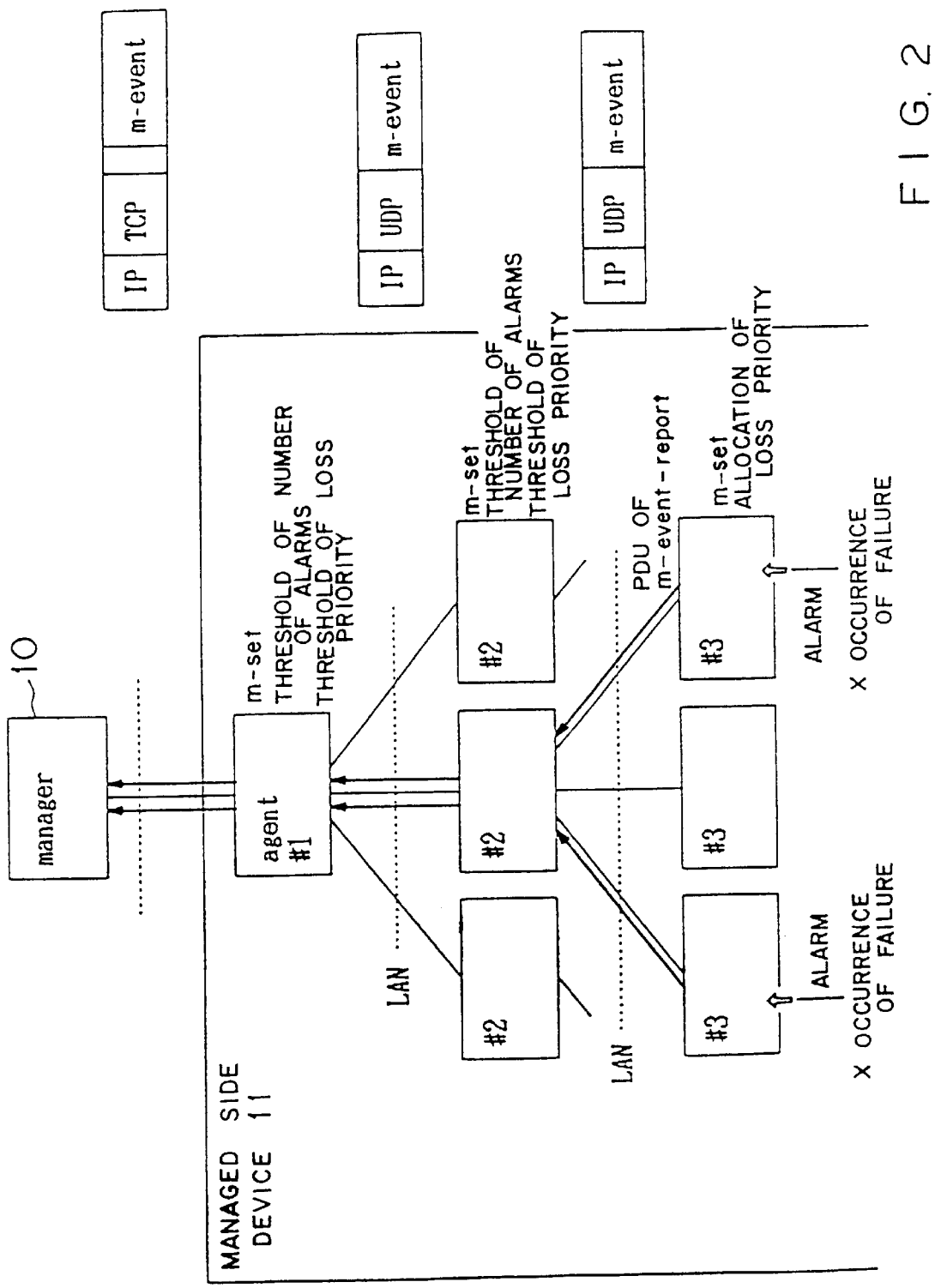
FIG. 2 shows a configuration of a communication apparatus to which the present invention is applied.

FIG. 2 shows a configuration of a communication apparatus to which the present invention is applied.

After information is collected and analyzed by a manager 10 of a managing side device (not shown in the drawing), a managed side device 11 is managed by the manger 10 sending commands to an agent of a point #1. The managed side device consists of boards for mounting ICs, a rack for accommodating a plurality of boards, each of which can be a point as a monitoring target unit, etc., and is collectively managed by connecting these with other points on a network. Points #2 and #3 in the drawing represent points in each layer, each point consists of one board or one rack, and the managed side device is managed in units of these points. Each point is provided with an agent or MO, and management control is available by communicating with the agent of the point #1.

Particularly, in the present invention, these points are connected with each other on a tree-shaped network as shown in the drawing, all information is collected in the agent of the point #1, and the managed side device is managed by the manager 10 through this agent. Although a communication protocol between agents of each point in the managed side device and a communication protocol between the agent of the point #1 and the manager 10 are not limited, the drawing shows a case where the manager 10 and the point #1, and each of the points in the managed side device 11 are connected by means of a LAN using a TCP and an IP, and a LAN using a user datagram protocol (UDP), respectively.

On the right side of FIG. 2 is shown a format of a PDU of an m-event-report sent from a point in each layer. As shown in the drawing, for a format of a PDU from the point #3 being the third layer to the point #2 in the second layer, an IP and a UDP are used, and headers of the IP and the UDP are attached to the heads of a command and data of the m-event-report. In the same way, a PDU is transmitted from the point #2 in the second layer to the point #1 in the first layer using an IP and a UDP, and the format of the PDU is the same as the format of the PDU from the third layer to the second layer. The transmitting protocol of a PDU from the point #1 of the first layer of the managed side device to the manager 10 being a managing device, is a protocol in which an IP and a TCP are used, and headers of the IP and the TCP are attached to the heads of the command and data of the m-event-report as shown in the drawing. Although in the above only an m-event-report is described, the same data format is applied to a case where a command such as an m-set command, etc. is transmitted from the manager 10.

When CMIP is applied to the present invention, first, loss priority is attached to a PDU of an m-event-report (described later). When the loss priority is attached, the loss priority has to be set for each alarm in the lowest order point layer (#3). For setting the loss priority there are two methods, that is, a method for allocating it in advance and a method for setting it from the manager 10 using an m-set command. It is assumed here that the loss priority is set from the manager 10 using an m-set command. Further, in each PDU receiving place, the threshold of the number of alarms (number of PDUs having alarm information stored in a receiving buffer of a certain point) and the threshold of loss priority have to be set. For setting this loss priority there are also the two methods of allocating them in advance and setting them from the manager 10 using an m-set command. It is also assumed here that the threshold of the number of alarms and the threshold of loss priority are set from the manager 10 using an m-set command.

FIG. 3 explains a configuration of communication network to which the present invention can be applied.

FIG. 3 is an example of an ATM network. In multiplexer equipment 23-1 to 23-6, ATM cells sent from each of subscriber sets 24-1 to 24-12 are multiplexed, and ATM cells multiplexed and sent from ATM-SWs 22-1 to 22-3 are distributed to each of subscriber sets 24-1 to 24-12 by using optical fibers. In an office 20, in order to concentratedly manage each of the ATM-SWs 22-1 to 22-3, for example, the ATM-SWs, multiplexer equipment and subscriber sets are connected with the managing device by means of a Q3 interface. Failures which occur in the subscriber sets 24-1 to 24-12 and the multiplexer equipment 23-1 to 23-6 are reported using an m-event-report command. An example of a frame format of the command is shown on the right of FIG. 3.

The network shown in the drawing is so configured as to manage the multiplexer equipment 23-1 to 23-6 and the subscriber sets 24-1 to 24-12 connected with each other using optical fibers in the office 20 by having a managing device 21 and the ATM-SWs 22-1 to 22-3. It is assumed that for a communication protocol between the ATM-SWs 22-1 to 22-3 and the multiplexer equipment 23-1 to 23-6, and a communication protocol between the multiplexer equipment 23-1 to 23-6 and the subscriber sets 24-1 to 24-12, an asymmetric digital subscriber line (ADSL) of an asynchronous transfer mode (ATM) is used. It is also assumed here that a LAN using an IP and a TCP is formed between the ATM-SWs 22-1 to 22-3 and the managing device 21 in the office 20. As shown on the right of the drawing, since an ATM mode is adopted between the ATM-SWs 22-1 to 22-3 and the subscriber sets 24-1 to 24-12, a PDU of the m-event-report becomes an ATM cell, an ATM header is attached to the PDU, and the PDU is transmitted. On the other hand, since between the managing device 21 and the ATM-SWs 22-1 to 22-3 a protocol using an IP and a TCP is used, headers of an IP and a TCP are attached to the PDU of the m-event-report, and the PDU is transmitted.

In this way, although different protocols are used for the managing device 21, ATM-SWs 22-1 to 22-3, multiplexer equipment 23-1 to 23-6, and the subscriber sets 24-1 to 24-12 of the lowest order layer, in a network where they are connected with each other as a tree, alarm information of the subscriber sets 24-1 to 24-12 is transmitted to higher layers in order, and finally the ATM-SWs, multiplexer equipment and subscriber sets are also managed by the managing device 21, the above-mentioned problems occur. Between the managing device 21 and the ATM-SWs 22-1 to 22-3, between the ATM-SWs 22-1 to 22-3 and the multiplexer equipment 23-1 to 23-6, and between the multiplexer equipment 23-1 to 23-6 and the subscriber sets 24-1 to 24-12, any communication protocol can be used, it is not limited to the protocol shown in the drawing.

Figure 4:
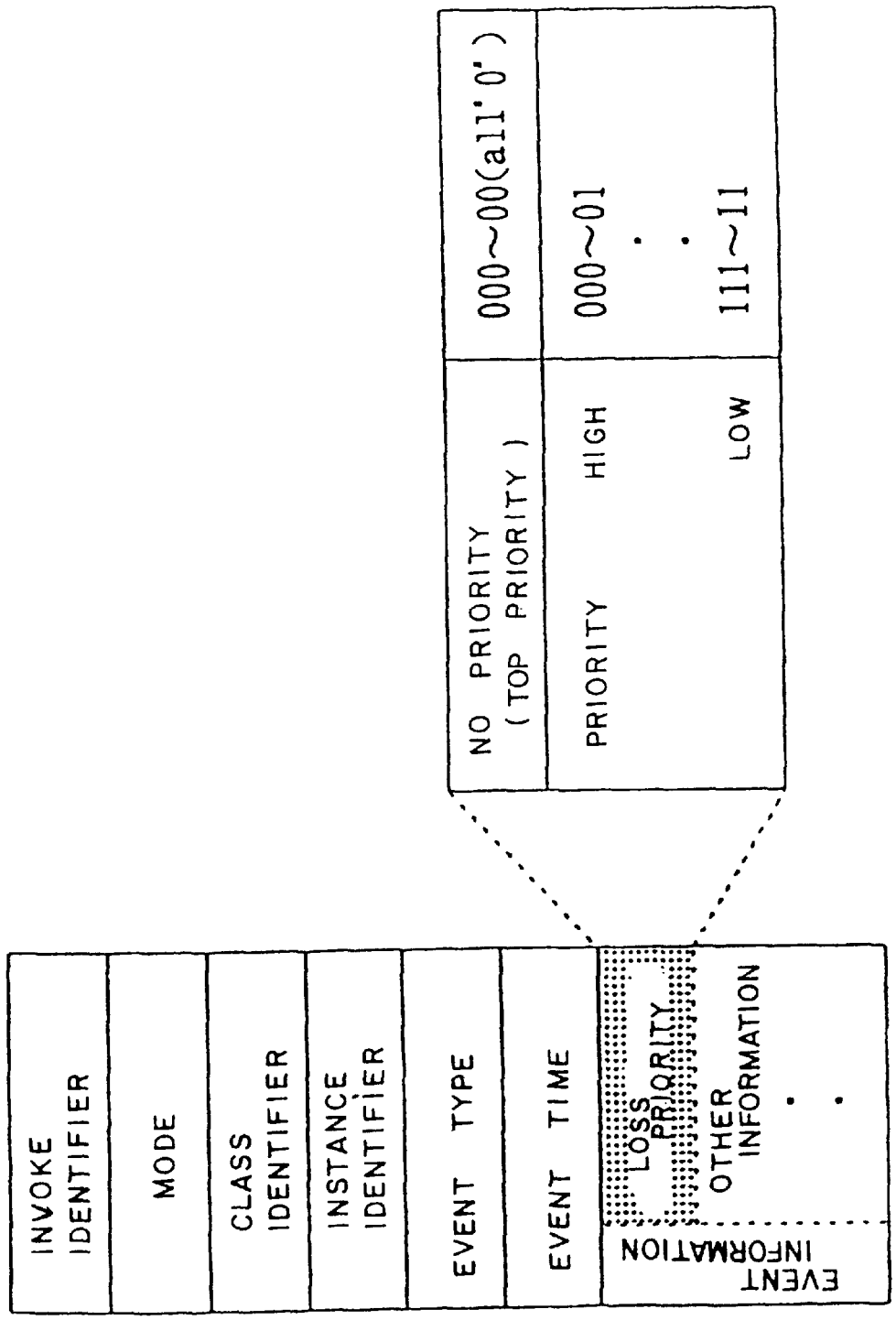
FIG. 4 shows a configuration of a PDU in the embodiment of the present invention.

FIG. 4 shows a configuration of a PDU in the embodiment of the present invention.

Although in the same way as a conventional apparatus, a PDU of an m-event-report of this embodiment comprises each of the parameters of an invoke identifier, a mode, a class identifier, an instance identifier, an event type, an event time and event information, the PDU of an m-event-report of this embodiment is, in particular, characterized in that a parameter of event information is provided with a parameter for representing loss priority.

Loss priority represents the degree of elimination in a case where a PDU is received at a point, and it is provided to allow elimination of PDUs with lower loss priority so that the volume of the contents of a buffer may not increase when the volume of the contents of a buffer of a point which has received the PDU exceeds a predetermined threshold. As an example of how to set loss priority, it can be considered that the loss priority of a PDU with no loss priority (top priority) is set "000 . . . 00 (all"0")" as shown in the drawing. This top priority means that the PDU should never be eliminated. Stages of a loss priority corresponding to bit numbers from "000 . . . 01" to "111 . . . 11" in a descending order can be provided. When the volume of the contents of a buffer exceeds a predetermined threshold, a PDU with the lowest loss priority is first eliminated.

Figure 5:
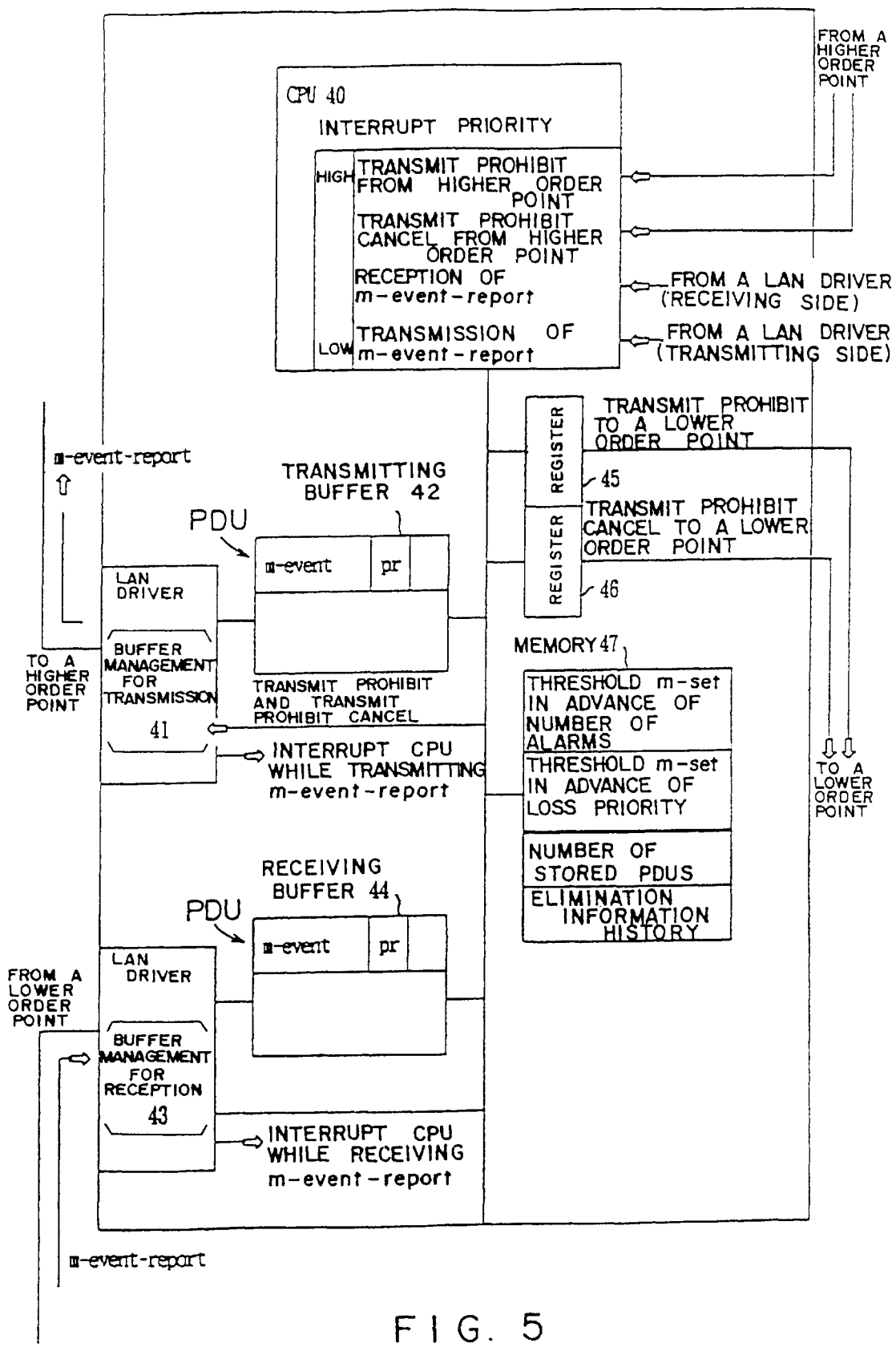
FIG. 5 is a block diagram of a receiving unit for receiving a PDU of an m-event-report at each point.

FIG. 5 is a block diagram of a receiving unit of a PDU of an m-event-report at each point.

The receiving unit comprises a CPU 40 being a key of the process, LAN drivers 41 and 43, a transmitting buffer 42, a receiving buffer 44, registers 45 and 46, and a memory 47.

When the LAN driver 43 receives a PDU of an m-event-report, the LAN driver 43 writes the PDU in the receiving buffer 44, interrupts the CPU 40, and sends the m-event report to the CPU 40. The CPU 40 processes the m-event-report of the receiving buffer according to an algorithm, to be described later. When the CPU 40 stores the m-event-report, the CPU 40 writes the PDU in the transmitting buffer 42. When the PDU is eliminated, the CPU 40 does not write it in the transmitting buffer 42. When the LAN driver 41 finds an m-event-report to be transmitted, it transmits the m-event-report, interrupts the CPU 40, and returns the m-event-report to the CPU 40. When a transmit prohibit or transmit prohibit cancel command arrives from a higher order point by interruption, the CPU 40 prohibits the LAN driver 41 from transmitting the m-event-report or cancels the prohibition for the transmission of the m-event-report.

For the CPU 40 an interrupt priority is set, and a transmit prohibit command from a higher order point has top priority. Next, priority is given to a transmit prohibit cancel command from a higher order point, an m-event-report receive command and an m-event-report transmit command, in that order. The above-mentioned processes are for the transmission and reception of an m-event-report. Besides the above-mentioned, registers 45 and 46, and a memory 47 are provided.

The memory 47 stores the threshold of the number of alarms (threshold for judging that an alarm should be issued when the number of PDUs becomes a predetermined number) of an m-set command received from a manager of the managing device, and the threshold of priority (threshold for instructing elimination of a PDU with a certain loss priority or lower) of an m-set command received from a manager of the managing device. Further, the number of stored PDUs is stored by the memory 47, and it is judged by comparing the number of stored PDUs with the threshold of the number of alarms whether or not a received PDU should be eliminated. When a PDU is to be eliminated, the threshold of priority stored in the memory 47 is compared with the loss priority set for a PDU, and PDUs with a loss priority lower than the threshold are eliminated. Then, the elimination information history stored in the memory 47 is referred to, and the receiving unit reports to a higher order point that the PDUs have been eliminated. This is finally reported to the manager in the managing device.

When a transmit prohibit command for PDUs is received from a higher order point, PDUs with low loss priority are eliminated from a lower order point. However, when there remains only PDUs with a high loss priority in the receiving buffer, the CPU 40 issues a signal to the register 45 to prohibit a lower order point from transmitting PDUs. Thus, the register 45 issues an interrupt signal in which the address of a CPU of a specific lower order point is designated, and prohibits the CPU of the lower order point from transmitting PDUs.

On the other hand, when the number of PDUs in the receiving buffer 44 becomes less than the number of alarms, the CPU 40 issues a signal to the register 46, and a transmit prohibit cancel signal in which the address of a CPU of the specific lower order point is designated, is sent to the lower order point.

The contents of a PDU elimination information history include, for example, existence or non-existence of PDU information to be reported (set a flag bit), time, location, number of eliminated PDUs, priority, the contents of PDUs, etc.

The contents Judged using the elimination information history include, for example, recognizing the existence or non-existence of the PDU elimination information to be reported (flag bit) and reporting the stored contents of the elimination information to a higher order point if there is some PDU elimination information to be reported.

Figure 6:
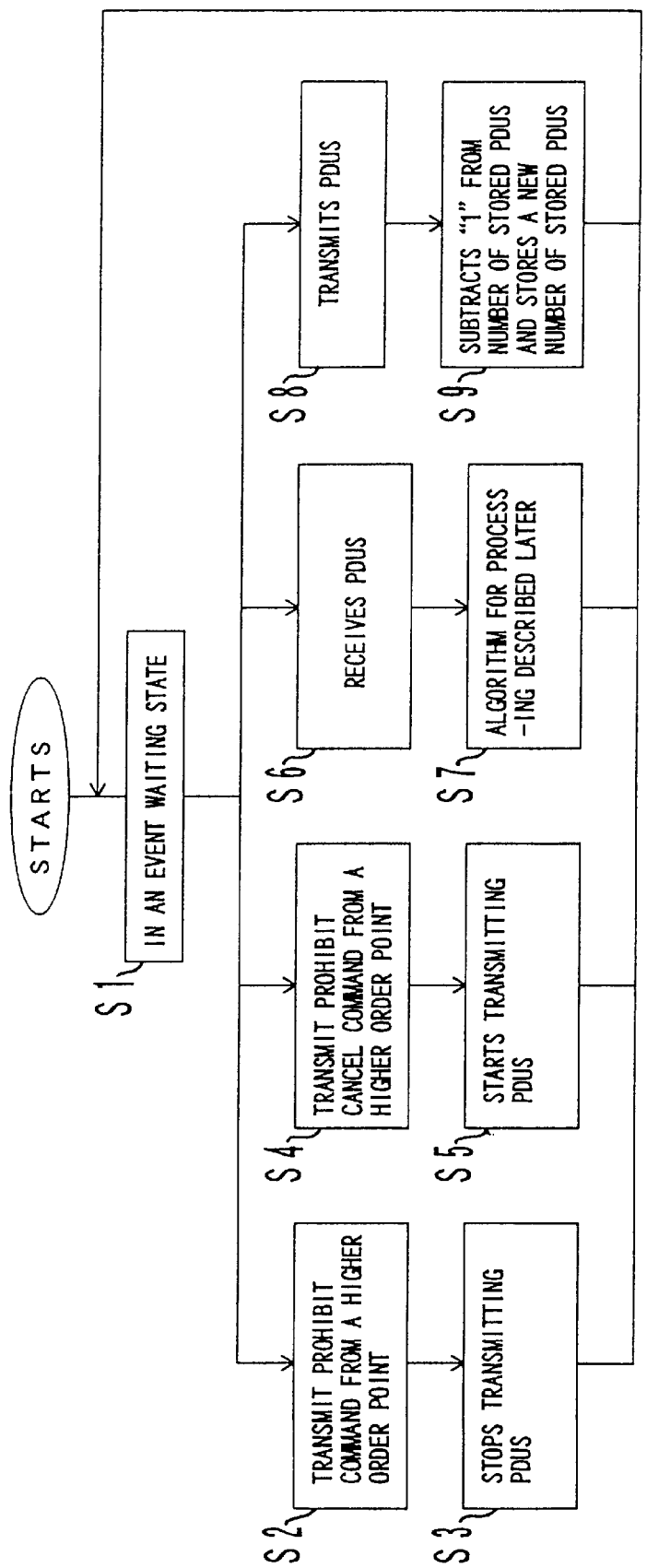
FIG. 6 is a flowchart showing the process of each point on the network of an embodiment of the present invention.

FIG. 6 is a flowchart showing the process of each point on the network of an embodiment of the present invention.

When a network has a tree-structure with three or more layers, and a PDU is transmitted from a lower order point to a higher order point, at the lowest order point a loss priority is attached to a PDU, and at a higher order point the received PDU is monitored.

The higher order point carries out the following four event monitoring processes, and when each event occurs, the relevant process is executed. However, the priority of these events is as follows:

1. A transmit prohibit command from a higher order point
2. A transmit prohibit cancel command from a higher order point
3. Reception of a PDU
4. Transmission of a PDU Here, the transmission and reception of a PDU means the transmission and reception of a PDU of an m-event-report, and the flow is directed from a lower order point to a higher order point on a network. The process in this case is described below.

First, each point enters a state of waiting for the occurrence of an event (step S1). When some event occurs, it is judged which of the above-mentioned events occurs. Then, if the event is judged as a transmit prohibit command from a higher order point (step S2), transmission of a PDU to the higher order point is stopped (step S3), the flow returns to step S1, and each point enters an event waiting state.

If an occurred event is judged to be a transmit prohibit cancel command from a higher order point (step S4), transmission of a PDU to the higher order point is started (step S5), and the flow returns to step S1. This is the operation in which the state where the transmission to a higher order point of a PDU is stopped in step S3 is released by a command from a higher order point.

If the occurred event is reception of a PDU (step S6), the process of the PDU is executed according to the processing algorithm (step S7), and the flow returns to step S1.

If the occurred event is judged as transmission of a PDU (step S8), in step S9 "1" is subtracted from the number of stored PDUs, and the new number of stored PDUs is stored, and the PDU is transmitted. However, as described above, when there is a transmit prohibit command from a higher order point and thereby the transmission of a PDU is prohibited due to the priority order of each event, the process of step S9 is not executed. Later, when a transmit prohibit cancel command arrives from a higher order point, and thereby the transmit prohibit state of the PDU is released, the type of the event is judged again, and if it is transmission of a PDU in step S8, in step S9 the PDU is transmitted to a higher order point.

Figure 7:
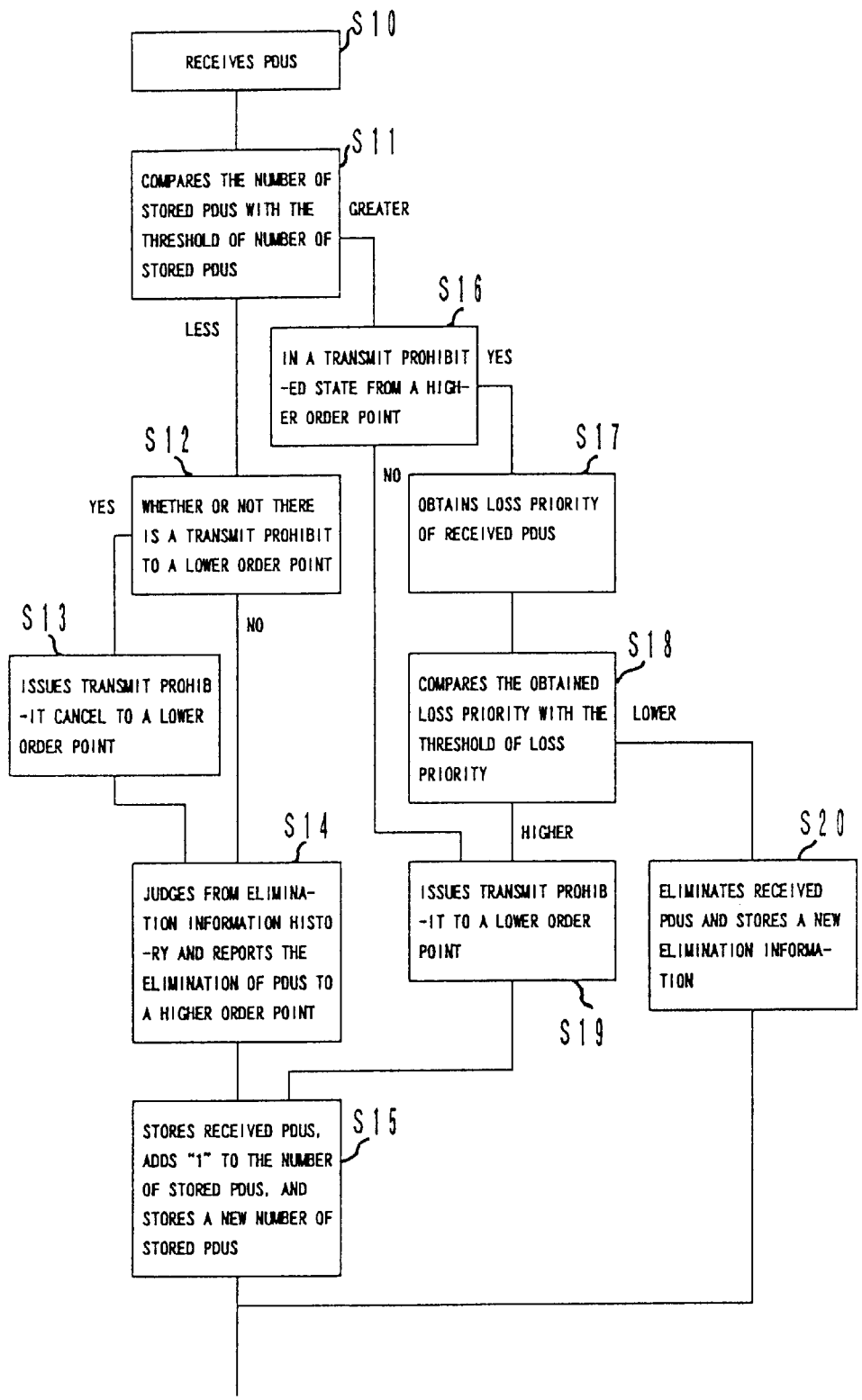
FIG. 7 is a detailed flowchart showing an embodiment of the process of step S7 in FIG. 6.

FIG. 7 is a detailed flowchart showing an embodiment of the process of step S7 in FIG. 6.

In step S10, when a PDU is received at a higher order (not the lowest order) point, first the number of stored PDUs is compared with the threshold of the number of PDUs (step S11), and if it is judged that the number of stored PDUs exceeds the threshold of the number of PDUs, it is checked whether or not there is a transmit prohibit command from a higher order point (step S16). The threshold of the number of PDUs can be set by the managing device using an m-set command, etc. in advance. It is necessary to set the value of the threshold taking into consideration redundancy in throughput sufficient to prevent a buffer from overflowing.

In step S16, when it is judged that each point is in a state of transmit prohibit due to a command from a higher order point, the loss priority of a received PDU (step S17) is obtained.

In step S18 the obtained loss priority is compared with the threshold of loss priority, and if the loss priority obtained from the received PDU is lower than the threshold of loss priority, the received PDU is eliminated and the elimination information is stored in a PDU elimination information history (step S20). The threshold of loss priority has to be set for each monitoring point in advance.

If it is judged in step S18 that the obtained loss priority is higher than the threshold of loss priority, in step S19 a transmit prohibit command is issued to a lower order point, and the flow proceeds to step S15.

In step S16, if there is not a transmit prohibit command from a higher order point, and it is judged that no point is in a state of transmit prohibit, the flow proceeds to step S19, a transmit prohibit report is issued to a lower order point, and the flow proceeds to step S15.

In step S11, when it is judged that the number of stored PDUs is less than the threshold of the number of PDUs, in step S12 it is judged whether or not a transmit prohibit command is issued to a lower order point, and if there is a transmit prohibit command, in step S13 a transmit prohibit cancel command is issued to a lower order point, and the flow proceeds to step S14. When in step S12 it is Judged that there is not a transmit prohibit command to a lower order point, the flow proceeds to step S14. In step S14, the elimination information history is referred to, and a PDU elimination report is issued to a higher order point. In the PDU elimination report the past elimination of PDUs is recorded, and when a higher order point enters a state of receiving a PDU, the PDU elimination report is to report that the PDU has been eliminated. In step S15 the received PDU is stored, after "1" is added to the number of stored PDUs, the new number of stored PDUs is stored.

Figure 8:
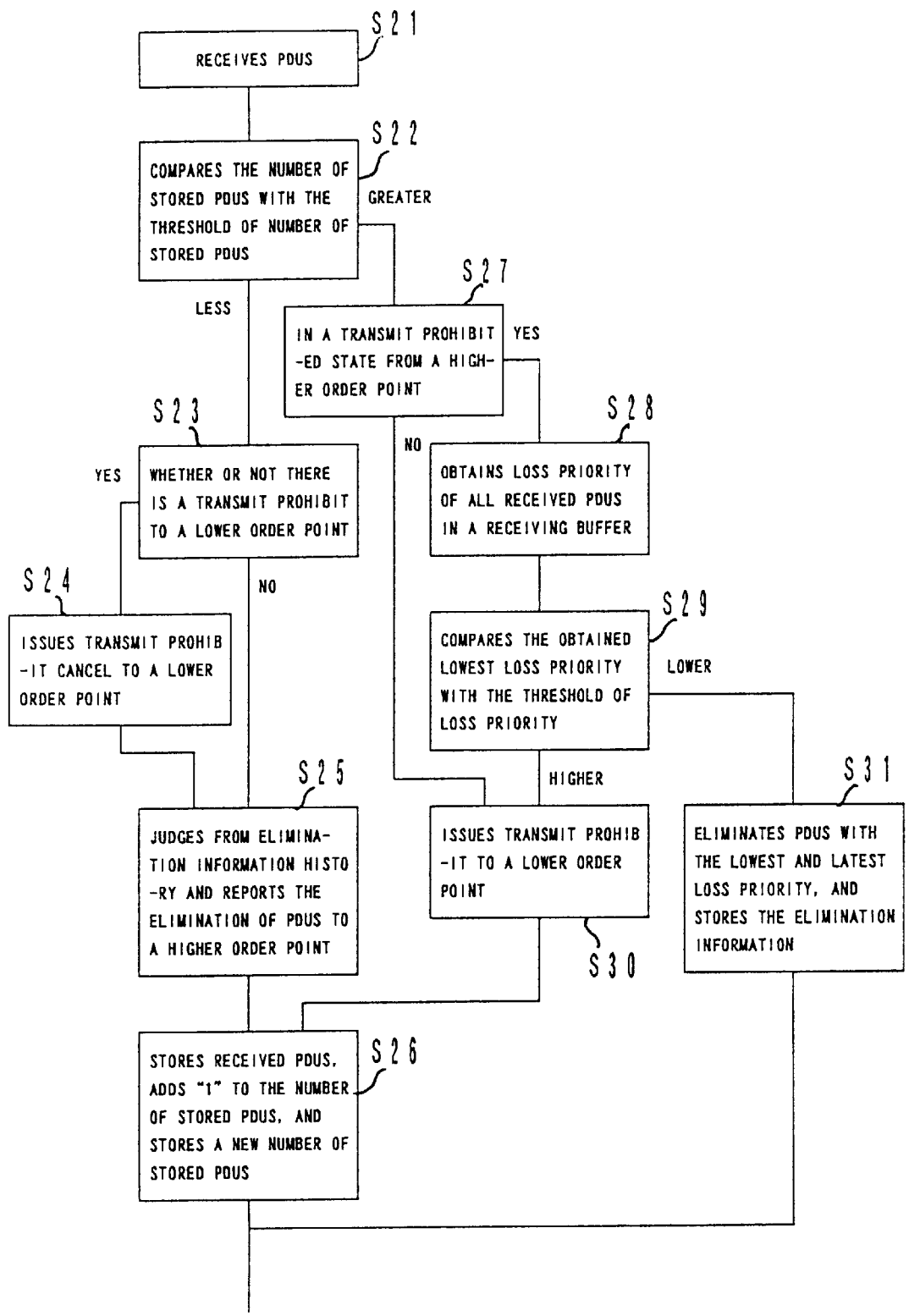
FIG. 8 is a detailed flowchart showing another embodiment of the process of step S7 in FIG. 6.

FIG. 8 is a detailed flowchart showing another embodiment of the process of step S7 in FIG. 6.

Although in the process of FIG. 7, when a PDU is to be eliminated, a PDU with a loss priority lower than the threshold is eliminated, in this embodiment it is so configured that out of PDUs in the receiving buffer the latest PDU with loss priority lower than the threshold may be eliminated. Thus, the receiving buffer can be effectively used.

First, in step S21, a PDU is received, and in step S22 the number of stored PDUs is compared with the threshold of the number of stored PDUs, and if it is judged that the number of stored PDUs is less than the threshold, the flow proceeds to step S23. In step S23 it is judged whether or not a transmit prohibit command is issued to a lower order point, and if it is issued, in step S24 a transmit prohibit cancel command is issued to a lower order point, and the flow proceeds to step S25. If in step S23 it is judged that a transmit prohibit command is not issued to a lower order point, the flow proceeds to step S25.

In step S25 an elimination information history relating to the past PDU elimination is referred to, and if a PDU is eliminated, it is reported to a higher order point that the PDU has been eliminated. Then, the flow proceeds to step S26, the received PDU is stored, and after "1" is added to the number of stored PDUs, the new number of stored PDUs is stored.

In step S22, if it is Judged that the number of stored PDUs is greater than the threshold of the number of stored PDUs, the flow proceeds to step S27, and it is judged whether or not there is a transmit prohibit command from a higher order point. If there is no transmit prohibit command, the flow proceeds to step S30, a transmit prohibit command is issued to a lower order point, and the flow proceeds to step S26.

In step S27, when it is judged that there is a transmit prohibit command from a higher order point, the flow proceeds to step S28, the loss priorities of all the received PDUs in the receiving buffer is obtained, and in step S29 the lowest loss priority of the obtained loss priorities is compared with the threshold of loss priority. If it is judged that the lowest loss priority is higher than the threshold, the flow proceeds to step S30, a transmit prohibit command is issued to a lower order point, and the flow proceeds to step S26.

In step S29, if it is judged that the lowest loss priority is lower than the threshold, in step S31 the latest PDU with the lowest priority is eliminated, and the elimination information is stored.

Figure 9:
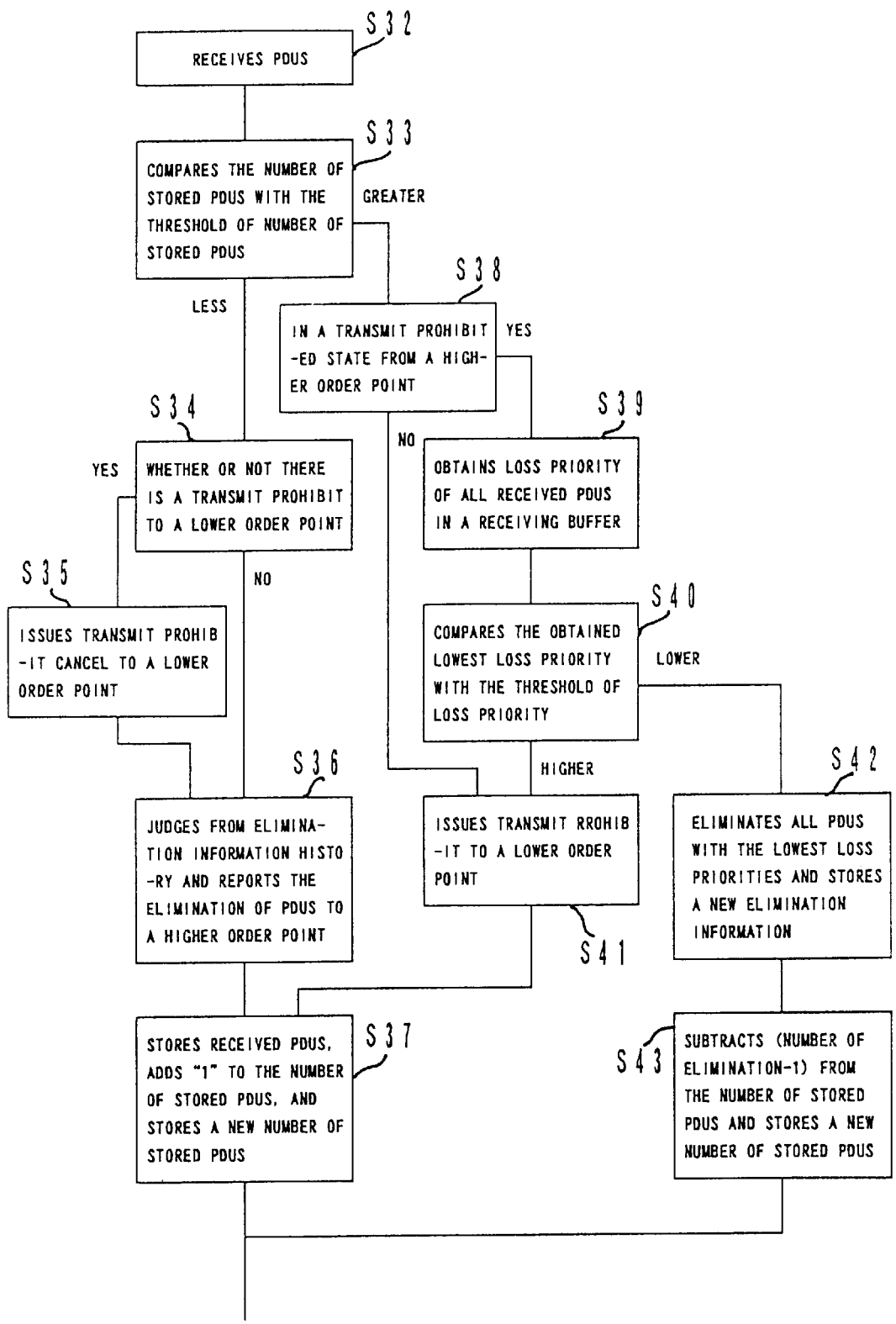
FIG. 9 is a detailed flowchart showing another embodiment of the process of step S7 in FIG. 6.

FIG. 9 is a detailed flowchart showing another embodiment of the process of step S7 in FIG. 6.

In this embodiment it is so configured that out of PDUs with loss priorities lower than the threshold of loss priority in the receiving buffer, all PDUs with the lowest loss priority are eliminated. Thus, the receiving buffer can be more effectively used.

In step S32, a PDU is received from a lower order point, and in step S33 the number of stored PDUs is compared with the threshold of the number of stored PDUs. If the number of stored PDUs is less than the threshold, in step S34 it is judged whether or not a transmit prohibit report is issued to a lower order point, and if it is issued, a transmit prohibit cancel report is issued to a lower order point (step S35), and the flow proceeds to step S36. If in step S34 it is judged that a transmit prohibit report is not issued to a lower order point, the flow proceeds to step S36, and in step S36 the past PDU elimination information is obtained from the elimination information history, and it is reported to a higher order point that the PDU has been eliminated. Then, the flow proceeds to step S37, the received PDU is stored, and after "1" is added to the number of stored PDUs, a new number of stored PDUs is stored.

In step S33 the number of stored PDUs is compared with the threshold of the number of stored PDUs, and if the number of stored PDUs is greater than the threshold, since there are more PDUs than the threshold, and the receiving buffer becomes full as it is, the flow proceeds to step S38. In step S38 it is judged whether or not a state of transmit prohibit from a higher order point is set, and if each point is not in a state of transmit prohibit, in step S41 a transmit prohibit command is issued to a lower order point. Thus, since the PDUs in the receiving buffer are transmitted to a higher order point gradually, the number of the PDUs in the receiving buffer gradually decreases. In step S41, when a transmit prohibit command is issued to a lower order point, the flow proceeds to step S37, the received PDUs are stored, and after "1" is added to the number of stored PDUs, the new number of stored PDUs is stored.

In step S38, if a state of transmit prohibit from a higher order point is set, since the number of PDUs in the receiving buffer cannot be reduced by transmitting the PDUs in the receiving buffer to a higher order point, in step S39 the loss priority of all the received PDUs in the receiving buffer is obtained, and in step S40 the obtained lowest loss priority is compared with the threshold of loss priority. If the lowest loss priority is higher than the threshold, the flow proceeds to step S41, a transmit prohibit report is issued to a lower order point, and the flow proceeds to step S37.

In step S40, if the lowest loss priority is lower than the threshold, the flow proceeds to step S42, and after (number of elimination−1) is subtracted from the number of stored PDUs, the new number of stored PDUs is stored.

Figure 10:
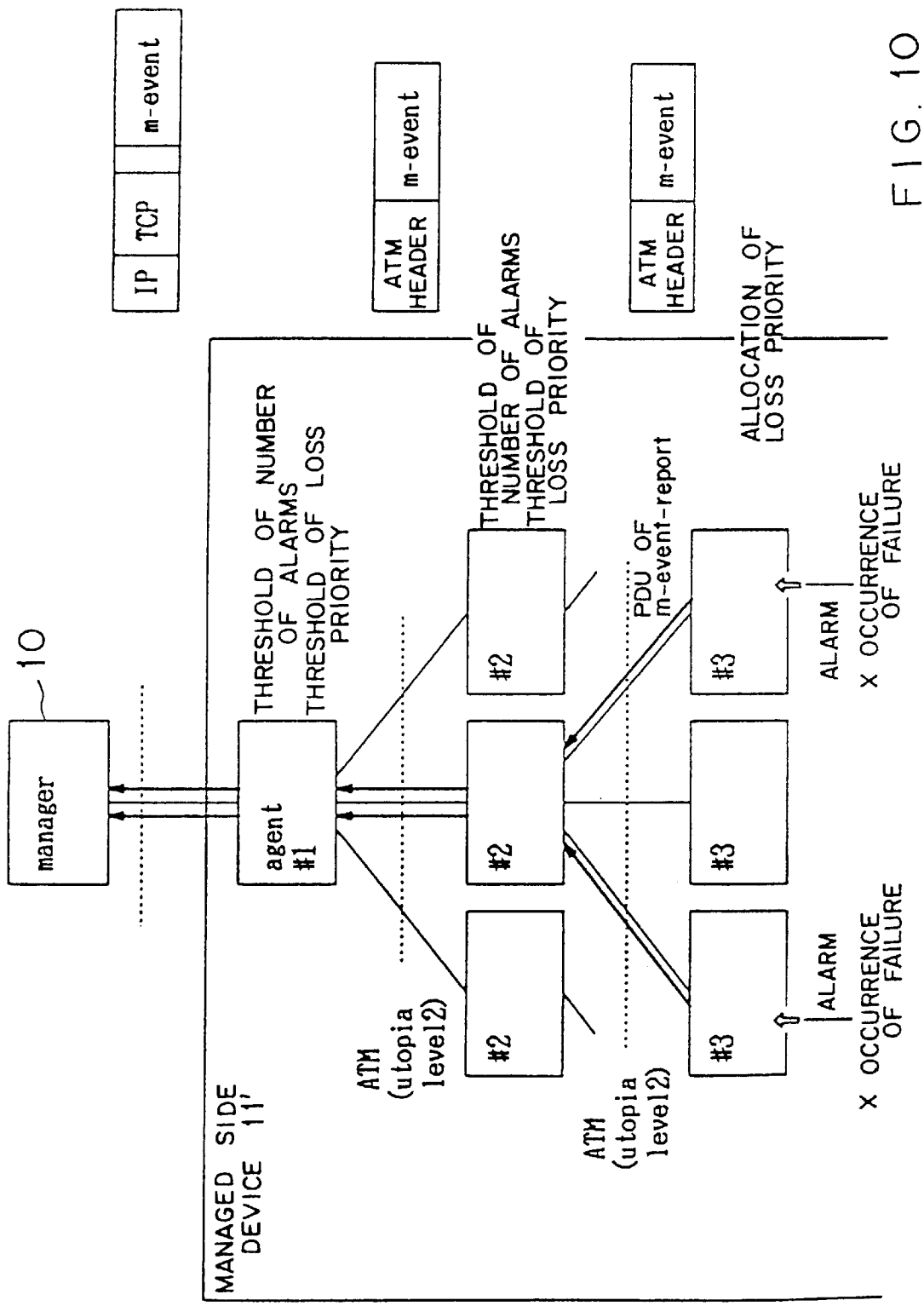
FIG. 10 shows another configuration of an apparatus in a managed side system corresponding to FIG. 2.

FIG. 10 shows another configuration of an apparatus in a managed side system corresponding to FIG. 2.

Although in FIG. 10 each point in the managed side system is connected with other points by means of a LAN, for an embodiment using a network other than a LAN a connection of points using an ATM can be considered.

In FIG. 10 it is assumed that the managed side device 11' has a hierarchical structure, and each interface is made using an ATM (Utopia level 2). To simplify the process at each point an m-event-report is mapped in only one ATM cell without an AAL function (AAL0). The attached loss priority of a PDU of the m-event-report is the same as the loss priority shown in FIG. 3. The threshold of the number of alarms (number of PDUs having alarm information in the receiving buffer) and the threshold of loss priority is set at each PDU receiving point by a CPU of each point in advance.

In the configuration shown in the drawing, when a point #3 of the third layer receives a PDU (m-event-report) including an alarm, the point #3 composes an ATM cell using this, and transmits the ATM cell to a point #2 in the center of the second layer. The data format is as shown on the right side of FIG. 10, and an ATM header is attached to a part for storing an m-event-report. When a point in the third layer is a point in the bottom layer, a PDU is transmitted with an alarm priority allocated to it. When the point #2 in the second layer receives the PDU, it compares the threshold of the number of alarms and the threshold of the loss priority of the received PDU with the number of PDUs in the buffer and the loss priority of the received PDU, and decides to transmit the PDU to the point #1 in a higher order, to eliminate it, or to issue a transmit prohibit command to the point #3 of the third layer. If there is no problem, the point #2 of the second layer composes an ATM cell using the PDU of the m-event-report, and transmits the ATM cell. In a point #1 of the first layer the same process as in the point #2 of the second layer is executed, and if there is no problem, this time the ATM cell is transmitted to a manager 10 of a managing device via a LAN using an IP and a TCP. In this way, occurrence of a failure is reported to the manager 10 of the managing device, and the failure is handled by the managing device.

Figure 11:
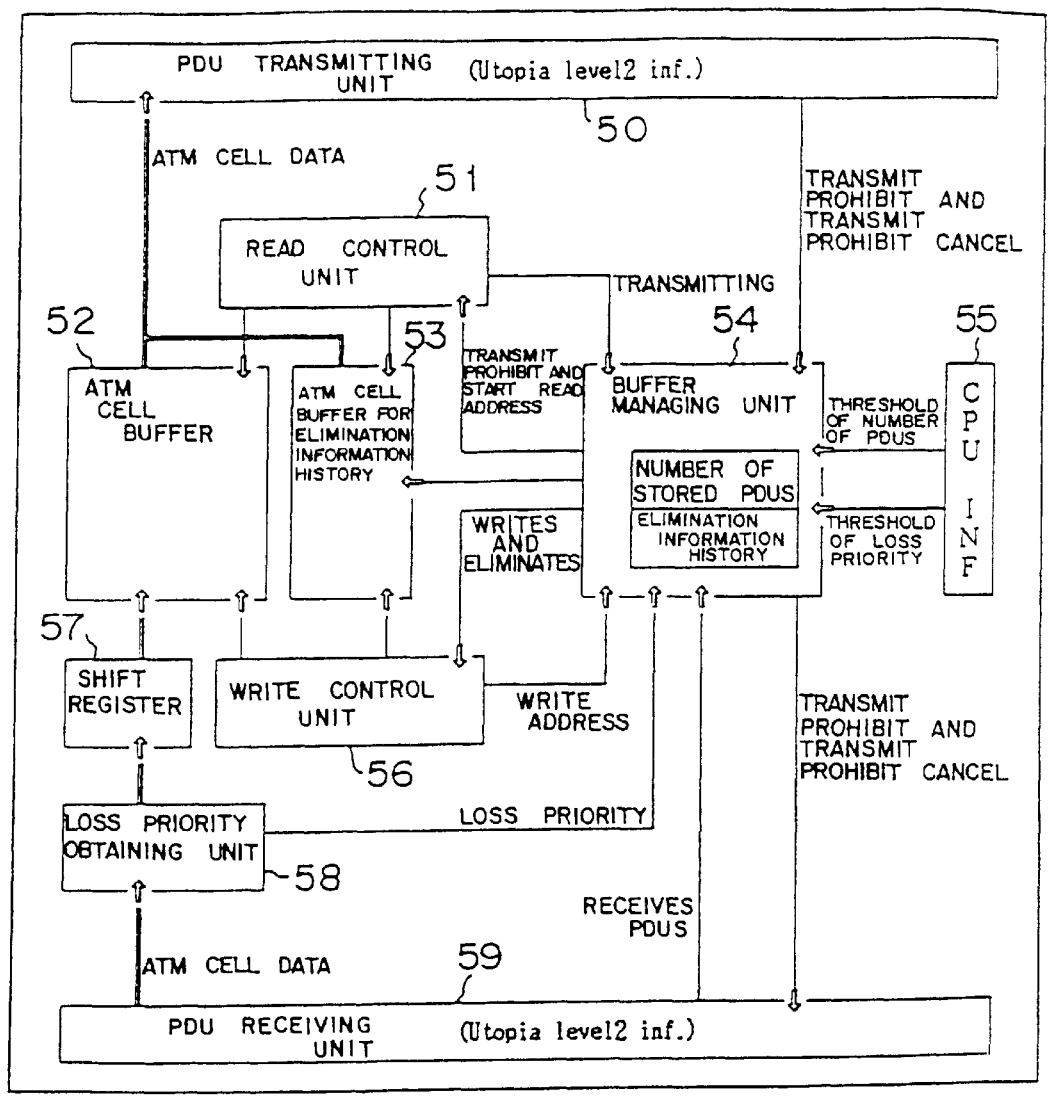
FIG. 11 is a block diagram showing the composition of a PDU transmitting and receiving unit at each point connected on an ATM network in the embodiment shown in FIG. 10.

FIG. 11 is a block diagram showing the composition of a PDU transmitting and receiving unit at each point connected on an ATM network of the embodiment shown in FIG. 10.

When an m-event-report is received from a lower order point, a PDU receive report is sent from a PDU receiving unit 59 (Utopia level2 inf.) to a buffer managing unit 54. In a priority obtaining unit 58, the loss priority set for the PDU is obtained, and is sent to the buffer managing unit 54. In the buffer managing unit 54, such processes as comparison between the number of stored PDUs and the threshold of the number of stored PDUs set in advance by a CPU (not shown in the drawing, connected to a CPU interface 55), recognition of a state of transmit prohibit from a higher order point and control transmission to a read control unit 51, comparison between the obtained loss priority and the threshold of loss priority set in advance by the CPU (not shown in the drawing), transmit prohibit and transmit prohibit cancel commands to a lower order point, write and eliminate control for a write control unit 56, counting up and counting down of the number of stored PDUs, and control in the buffer using a write address from a write control unit 56, are executed. In the write control unit 56 using a write and eliminate commands from the buffer managing unit 54, an ATM cell data stored by a shift register 57 is written in the buffer, and write address information is sent to the buffer managing unit 54. In the read control unit 51, transmit prohibit, start and write address commands from the buffer managing unit 54 are received and the buffer is read. Further, in the buffer managing unit 54, an elimination information history is managed, and writing in and reading from a ATM cell buffer for the elimination information history 52 are executed through the write control unit 56 and read control unit 51, respectively.

An ATM cell buffer for the elimination information history 53 is a buffer in which a special format of an ATM cell for reporting a PDU eliminated from the relevant point to a higher order point is stored. When a transmit prohibit command arrives from a higher order point, the relevant point instructs the elimination of a PDU or prohibition of a lower order point from transmitting. If a PDU is eliminated, the elimination is recorded in the buffer control unit 54 every time a PDU is eliminated. Then, when a higher order point instructs the lower order point to cancel the transmit prohibit, by an instruction from the CPU, not shown in the drawing, the buffer managing unit 54 refers to the elimination information history, and it is judged whether or not the PDU has been eliminated. When the PDU has been eliminated, the elimination information history of the buffer managing unit 54 is referred to, necessary information is obtained, and the obtained information is embedded in an ATM cell with a predetermined format of the ATM cell buffer for the elimination information history. Then, by the instruction from the read control unit 51, the ATM cell is transmitted to a PDU transmitting unit 50, and the ATM cell is sent to a higher order point. This information on the elimination information history is transmitted to the manager of the managing device for managing the managed side device, including the point in the drawing, and is used as information for monitoring at which point the PDU is eliminated.

By using the communication control apparatus of the present invention, an unexpectedly large volume of PDUs can be prevented in advance from being collected at one time and being stacked due to a buffer being full and the limitations in the throughput. Further, in this apparatus, PDUs are not eliminated unreasonably, by utilizing the maximum buffer capacity on a network while recovery from a congestion state is awaited. Only when circumstances compel it are PDUs with a low loss priority eliminated. That is, by adopting priority in the processing, local and immediate measures can be taken against congestion.

What is claimed is:

1. An apparatus for controlling communications used in a system in which a plurality of monitoring target units are connected with each other in a tree-shape on a network, each monitoring target unit comprising:

receiving unit for receiving data from a monitoring target unit in a lower order on a tree-shaped network;

a buffering unit for temporarily storing the received data;

a transmitting unit transmitting the data stored in the buffering means to a monitoring target unit in a higher order on a tree-shaped network; and a monitoring unit for monitoring the volume of data stored in said buffering unit and instructing a monitoring target unit in a lower order not to transmit the data if the data volume exceeds a predetermined threshold, wherein loss priority representing priority in elimination is attached to said data, and said monitoring unit monitors the volume of data stored in said buffering unit, instructs the monitoring unit not to transmit the data when the relevant data volume exceeds the predetermined threshold and the monitoring target unit in a higher order compares loss priority attached to data transmitted from the monitoring target unit in a lower order with a threshold of loss priority set in advance, and if the threshold of the relevant loss priority is greater than the loss priority attached to data, eliminates the received data.

2. The apparatus for controlling communications according to claim 1, wherein said data to be eliminated are data with the lowest loss priority of all data in said buffering unit.

3. The apparatus for controlling communications according to claim 2, wherein said data to be eliminated are the data received latest.

4. The apparatus for controlling communications according to claim 3, wherein all the data in said buffering unit with said least loss priority being less than the threshold of said loss priority are eliminated.

5. The apparatus for controlling communications according to claim 1, wherein when data are eliminated, said monitoring target unit in a lower order reports to a monitoring target in a higher order that the data has been eliminated.

6. An apparatus for controlling communications used in a system in which a plurality of monitoring target units are connected with each other in a tree-shape on a network, each monitoring target unit comprising:

a receiving unit for receiving data from a monitoring target unit in a lower order on a tree shaped network;

a buffering unit for temporarily storing the received data;

a transmitting unit for transmitting the data stored in the buffering unit to a monitoring target unit in a higher order on a tree-shaped network; and a monitoring unit for monitoring the volume of data stored in said buffering unit and instructing a monitoring target unit in a lower order not to transmit the data if the data volume exceeds a predetermined threshold, wherein said monitoring unit executes the following processes with priority in order:

1. A transmit prohibit command from the monitoring target unit in a higher order;

2. A transmit prohibit cancel command from the monitoring target unit in a higher order;

3. Reception of data; and

4. Transmission of data.

7. A method for controlling communications used in a system in which plurality of monitoring target units are connected with each other in a tree-shape on a network, comprising the steps of:

receiving data from a monitoring target unit in a lower order on a tree-shaped network;

temporarily storing the received data;

transmitting the data temporarily stored to a monitoring target in a higher order on a tree-shaped network; and monitoring the volume of data temporarily stored, and if the data volume exceeds a predetermined threshold, instructing a monitoring target unit in a lower order not to transmit data, wherein loss priority representing the order of elimination is attached to said data, and the volume of data temporarily stored is monitored, a loss priority attached to data transmitted from the monitoring target unit in a lower order is compared with the threshold of loss priority set in advance when the data volume exceeds a predetermined threshold, and the monitoring target unit in the higher order instructs the monitoring target unit in the lower order not to transmit data, and the received data is eliminated if the threshold of loss priority is greater than the loss priority attached to the data.

8. The method for controlling communications according to claim 7, wherein said data to be eliminated are data with the lowest priority of data temporarily stored.

9. The method for controlling communications according to claim 8, wherein said data to be eliminated are data stored latest.

10. The method for controlling communications according to claim 10, wherein out of data temporarily stored, all data of the lowest loss priority and a loss priority lower than the threshold of loss priority are eliminated.

11. The method for controlling communications according to claim 7, wherein when data are eliminated, a report that data have been eliminated is issued to a monitoring target unit in a higher order.

12. A method for controlling communications used in a system in which a plurality of monitoring target units are connected with each other in a tree-shape on a network, comprising the steps of:

receiving data from a monitoring target unit a lower order on a tree-shaped network;

temporarily storing the received data;

transmitting the data temporarily stored to a monitoring target in a higher order on a tree-shaped network; and monitoring the volume of data temporarily stored, and if the data volume exceeds a predetermined threshold, instructing a monitoring target unit in a lower order not to transmit data, wherein the following processes are executed with priority in order:

1. A transmit prohibit command from the monitoring target unit in a higher order;

2. A transmit prohibit cancel command from the monitoring target unit in a higher order;

3. Reception of data; and

4. Transmission of data.

* * * * *